United States Patent
Åkesson

(10) Patent No.: US 8,910,949 B2
(45) Date of Patent: Dec. 16, 2014

(54) SEAL WITH FIRE PROTECTION

(75) Inventor: Niklas Åkesson, Lyckeby (SE)

(73) Assignee: Roxtec AB, Karlskrona (SE)

( * ) Notice: Subject to any disclaimer, the term of this patent is extended or adjusted under 35 U.S.C. 154(b) by 874 days.

(21) Appl. No.: 12/451,377

(22) PCT Filed: May 5, 2008

(86) PCT No.: PCT/SE2008/050505
§ 371 (c)(1),
(2), (4) Date: May 11, 2010

(87) PCT Pub. No.: WO2008/140399
PCT Pub. Date: Nov. 20, 2008

(65) Prior Publication Data
US 2010/0219589 A1 Sep. 2, 2010

(30) Foreign Application Priority Data
May 16, 2007 (SE) ..................... 0701182

(51) Int. Cl.
*F16L 21/02* (2006.01)
*F16J 15/02* (2006.01)
*F16L 5/04* (2006.01)
*A62C 2/06* (2006.01)
*F16L 5/08* (2006.01)

(52) U.S. Cl.
CPC . *F16L 5/04* (2013.01); *A62C 2/065* (2013.01); *F16L 5/08* (2013.01)
USPC .......................................... 277/616; 277/637

(58) Field of Classification Search
USPC ......... 277/602–603, 608–609, 616, 630, 637, 277/650
See application file for complete search history.

(56) References Cited

U.S. PATENT DOCUMENTS

| 3,124,502 | A | * | 3/1964 | Radke | ........................ | 428/66.4 |
| 4,061,344 | A |   | 12/1977 | Bradley et al. | | |
| 4,622,436 | A | * | 11/1986 | Kinnan | ........................ | 174/77 R |
| 5,427,386 | A | * | 6/1995 | Breaker | ........................ | 277/627 |
| 5,508,321 | A | * | 4/1996 | Brebner | ........................ | 523/179 |
| 5,527,047 | A | * | 6/1996 | Waterland, III | ........................ | 277/610 |

(Continued)

FOREIGN PATENT DOCUMENTS

| JP | 05-095134 | 12/1993 |
| JP | 2002-174367 | 6/2002 |
| WO | WO 2004/112211 | 12/2004 |

OTHER PUBLICATIONS

International Search Report.

*Primary Examiner* — Vishal Patel
(74) *Attorney, Agent, or Firm* — Harness, Dickey & Pierce, P.L.C.

(57) ABSTRACT

A seal for pipe penetration or the like is formed, in at least one embodiment, of two halves, the seal received in a sleeve or opening of a wall or the like. The seal forms a central opening for a pipe or tube when the seal halves are brought together. Each seal half is formed of two base parts. Between the base parts a layer of intumescent material is placed. On the inside of the base parts peelable layers are arranged. The layers are peeled off to adapt the inner diameter of the seal to the pipe or tube received. In case of fire, the intumescent material will expand which expansion will collapse and close off the pipe or tube received in the seal.

13 Claims, 1 Drawing Sheet

(56) References Cited

U.S. PATENT DOCUMENTS

| | | | |
|---|---|---|---|
| 5,747,732 A * | 5/1998 | Bera et al. | 174/483 |
| 5,775,702 A * | 7/1998 | Laeremans et al. | 277/314 |
| 6,521,840 B1 * | 2/2003 | Kreutz | 174/151 |
| 7,204,492 B2 * | 4/2007 | Hoyes et al. | 277/610 |
| 2004/0080119 A1 * | 4/2004 | Goll | 277/607 |
| 2005/0121217 A1 * | 6/2005 | Hedstrom | 174/52.3 |
| 2006/0272241 A1 | 12/2006 | Kreutz | |

* cited by examiner

SEAL WITH FIRE PROTECTION

TECHNICAL FIELD

The present invention concerns a seal forming a pipe or tube penetration or transition, including fire protection. It is especially developed for plastic pipes or tubes.

PRIOR ART

Seals of this type are normally received in a sleeve received in a wall or an opening in a wall. The seals may be used in a lot of different embodiments and may have to seal against fluid, dust, dirt, gas, rodents, termites etc. Often there is a pressure difference of great magnitude on the opposing sides of the wall. Thus, to function in the desired way the seal must fit snugly into the sleeve, the opening or the like in which it is received and the seal must be adapted to the actual mounting dimension. The mounting dimension is dictated by the inner diameter of the sleeve or the opening.

Furthermore the pipes or the like that should be fitted in the seal may be of many different sizes. It is therefore an advantage if the seal is adaptable to pipes having different outer diameters.

Pipes received in the seals of the present type are often used for different gases or liquids, such as water, compressed air, hydraulic fluid and cooking gas. If fire break out on one side of a wall receiving a seal there is a risk that the fire will be spread through the wall by means of the pipe or the fluid received inside the pipe. It is previously known to have intumescent material, i.e. material that expands when heated, placed in connection with an opening. The intumescent material is normally placed as a separate unit in connection with an opening and should close off the opening in case of fire.

THE INVENTION

As used in this description the expressions "axial", "radial" and similar expressions are in relation to a pipe or tube received in the seal.

One object of the present invention is to arrange fire protection directly in a seal. Thus, one avoids the need of arranging the fire protection as a separate unit. Further, one avoids the problem of adapting the fire protection to the specific installation. The fire protection should be such that the pipe or tube received inside the seal is automatically closed, hindering any gas or fluid to pass through the pipe or tube.

A further object is to be able to adapt one single seal for many different mounting dimensions, in order to reduce the number of different seals needed to cover a wide range.

According to the invention a seal is arranged forming a pipe or tube penetration or transition. The seal is formed of two halves forming at least one central opening for a pipe or tube when the seal halves are brought together. Each seal half has the form of two base parts between which a layer of intumesent material is placed.

The seal is made of an elastic material and has fittings at both ends. The fittings are connected by means of screws going through the seal. By means of the screws and fittings the seal may be compressed in axial direction, at such an axial compression the seal will expand in radial direction. By the radially expansion the seal will fit snugly in the sleeve or opening.

Further objects and advantages of the present invention will be obvious to a person skilled in the art from reading the detailed description below of preferred embodiments.

BRIEF DESCRIPTION OF THE DRAWINGS

The invention will be described more closely below by way of an example and with reference to the enclosed drawings. In the drawings.

DETAILED DESCRIPTION OF PREFERRED EMBODIMENTS

Figure 1:
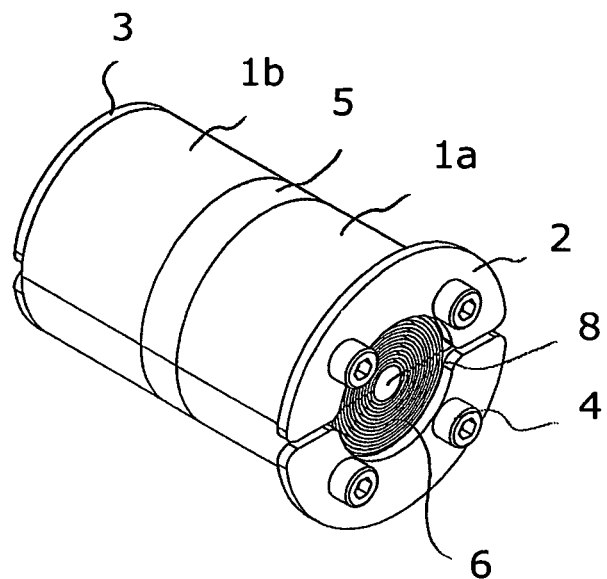
FIG. 1 is a perspective view of a seal according to the invention.
Figure 2:
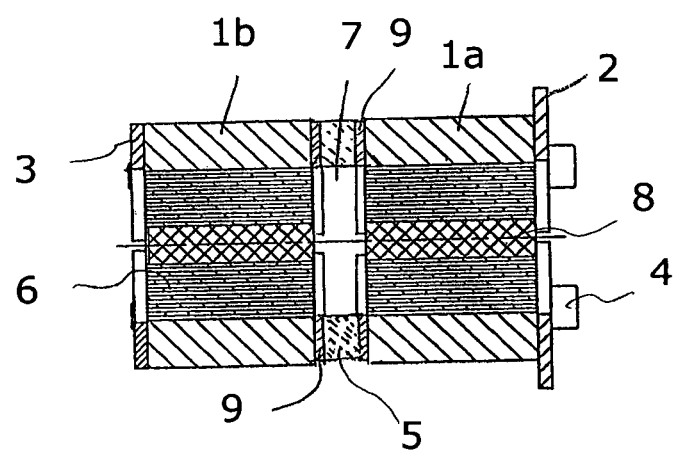
FIG. 2 is a sectional view of the seal of FIG. 1.

The seal of the present invention is to be used for a pipe penetration or transition. It is formed of two identical parts, which in use are brought together to form the seal. The two parts of which the seal is formed each has a semicylindrical form. Each seal half has two base parts of an elastic material. A front base part 1a and a rear base part 1b. At the ends of the front base part 1a and the rear base part 1b a front fitting 2 and a rear fitting 3 are arranged, respectively.

Between the front and rear base parts 1a, 1b a layer of intumescent material 5 is placed. In practice the intumescent material will form a ring in the seal. The layer of intumescent material 5 has a relatively short axial extension compared to the axial extension of the base parts 1a, 1b. In one embodiment the intumescent material 5 has an axial extension that is about 10% of the total axial extension of the base parts 1a, 1b. Thus, the two base parts 1a, 1b are placed on both sides of the ring of intumescent material 5 on each seal half. The intumescent material 5 is placed at the opposite end of each base part 1a, 1b compared to the respective fitting 2, 3. The layer of intumescent material 5 is fixed to the respective base part by means of a mechanical positioning via studs 9 in between the base parts 1a, 1b. The form of the studs 9 corresponds with the form of the front and rear fittings 2, 3. Thus, each stud 9 has the form of half a ring.

The fittings 2, 3 are held at the base parts 1a, 1b by means of screws 4. Openings are arranged in the fittings 2, 3, the base parts 1a, 1b, the studs 9 and the intumescent material 5 to receive the screws 4. The screws 4 are threaded at their outer ends to co-operate with threaded openings of the rear fitting 3. The function of the screws 4 co-operating with the fittings 2, 3 is to compress the base parts 1a, 1b in an axial direction, with maintained accommodation for the uncompressed intumescent material 5 via the mechanical studs 9 in between the base parts 1a, 1b. Thus the intumescent material 5 will not be compressed as the studs 9 mechanically separate the base parts 1a, 1b during compression. Even though two screws 4 are used at each seal half in the shown embodiment, any number of screws may be used. In the shown embodiment the screws 4 are of the type socket head cap screws. A person skilled in the art realises that any type of fastening means allowing the fittings 2, 3 to be moved towards each other may be used. Thus, it is possible to use screws and nuts. Preferably, the screws should be possible to tighten from one side.

Normally the intumescent material 5 and the studs 9 have a somewhat smaller outer diameter than the rest of the seal.

The front fitting 2 according to the shown embodiment, is the fitting on that side of the base part 1 from which the screws 4 normally are manipulated. The rear fitting 3 is placed on the opposite side to the front fitting 2. In many embodiments the front fitting 2 is given an outer radius exceeding the inner diameter of the sleeve or the opening in a wall. This is done for a more precise placing of the seal, as the front fitting 2 will abut the end of the sleeve or the wall. Instead of the radius of the front fitting 2 exceeding the inner dimension of the sleeve or opening, a number of extended parts fixed to or integrated with said fitting 2 may extend over the inner radius of the sleeve or the opening.

A number of peelable layers 6 are arranged on the inside of the base parts 1a, 1b. The peelable layers 6 are made in such a way and of a material allowing them to stick together after production of each seal half. However, they adhere loose enough to be peeled off by hand.

The base parts 1 have normally a somewhat larger axial extent than the peelable layers 6 in order to enable the base parts 1 to be compressed in the axial direction without hindrance from the peelable layers 6. There are no peelable layers on the inside of the layer of intumescent material 5. In stead a gap 7 is formed inside the intumescent material 5.

On the inside of the peelable layers 6 a blind 8 is arranged in each base part 1a, 1b. The blinds 8 are placed in one seal half each. In the shown embodiment there is one blind 8 in each base part 1a, 1b. However, in other embodiments there is only one blind going all the way through the seal.

The two seal halves are formed to have a central, cylindrical open space when brought together. A pipe is to be received in said open space. Normally, the seal is received in a sleeve, or the like in some kind of wall, which sleeve is fixed to the wall. The seal may alternatively be placed in an opening formed directly in a wall.

In use the two seal halves are to be placed around the pipe. At installation the blind 8 is first removed. To adapt the seal to the diameter of the pipe one or more of the peelable layers 6 are peeled off. When the appropriate number of layers 6 has been peeled off the two seal halves are placed surrounding the pipe. Due to the gap 7 inside the intumescent material 5 the intumescent material will not hinder the placement of the seal halves around the pipe. Then the screws 4 are turned in such a way that the front and rear fittings 2, 3 will be moved towards each other. As the fittings 2, 3 move towards each other the base parts 1a, 1b are compressed in the axial direction. By means of the studs 9 the intumescent material 5 is not compressed. The axial compression of the base parts 1a, 1b leads to an expansion of the base parts 1a, 1b in the radial direction. The base parts 1a, 1b will expand radially both inwards and outwards and, thus, seal both outwards towards the available space and inwards towards the pipe. The expansion outwardly also means that the seal will be securely fixed in the sleeve or opening.

In case of fire the intumescent material 5 will expand, due to the heat. The expansion of the intumescent material 5 will collapse the pipe or tube and hinder that any gas or fluid passes in the pipe or tube. Thus, a fire will be stopped from passing through the pipe or tube.

Even though the seal has been shown having a circular cross section, a person skilled in the art realises that the seal of the present invention may have any cross section form. Thus, it may be oval, square, rectangular, polygon etc.

The invention claimed is:

1. A seal forming a pipe or tube penetration or transition, the seal comprising:
    two substantially identical and axially compressible seal halves forming at least one central opening for a pipe or tube when the seal halves are brought together, wherein each of the two seal halves includes two base parts;
    mechanical studs in contact with the base parts and separate the base parts and form a gap between the base parts, the gap having a fixed length in an axial direction of the seal;
    a layer of intumescent material in the gap between the mechanical studs, wherein the mechanical studs maintain the fixed length during compression of the seal halves; and
    a front fitting and a rear fitting, respectively, is arranged at opposing ends of the base parts, which fittings are connected to each other by means of screws received in through openings of the base parts and the layer of intumescent material.

2. The seal of claim 1, wherein the intumescent material will expand radially under heat and collapse and close off the pipe or tube and wherein the layer of intumescent material is fixed to the respective base parts by a mechanical positioning via the studs in between the base parts.

3. The seal of claim 1, wherein an axial extension of the layer of intumescent material is shorter than the axial extension of the base parts.

4. The seal of claim 3, wherein the axial extension of the intumescent material is about 10% of the total axial extension of the base parts.

5. The seal of claim 1, wherein the base parts have peelable layers on the inside, which layers removably adhere to each other and which layers are configured to be peeled off to vary the inner diameter of each central opening.

6. The seal of claim 5, wherein a thickness in a radial direction of the layer of intumescent material corresponds with a thickness in a radial direction of the base parts, excluding the peelable layers.

7. The seal of claim 1, wherein a gap is formed inside the layer of intumescent material.

8. The seal of claim 1, wherein the base parts are of an elastic material.

9. The seal of claim 1, wherein the seal has a substantially cylindrical design.

10. The seal of claim 1, wherein each stud has a form of a half ring.

11. The seal of claim 1, wherein the studs have a length in an axial direction of the seal that is shorter than base parts.

12. The seal of claim 1, wherein the studs do not pass through the base parts.

13. The seal of claim 1, wherein the intumescent material is disposed only between the studs.

* * * * *